(12) United States Patent
Blank et al.

(10) Patent No.: US 10,861,373 B2
(45) Date of Patent: Dec. 8, 2020

(54) REDUCING PEAK CURRENT USAGE IN LIGHT EMITTING DIODE ARRAY

(71) Applicant: Facebook Technologies, LLC, Menlo Park, CA (US)

(72) Inventors: William Thomas Blank, Bellevue, WA (US); Ilias Pappas, Cork (IE); Michael Yee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/430,135

(22) Filed: Jun. 3, 2019

(65) Prior Publication Data

US 2020/0357331 A1 Nov. 12, 2020

(30) Foreign Application Priority Data

May 9, 2019 (GR) .............................. 20190100204

(51) Int. Cl.
*G09G 3/20* (2006.01)
*G06F 1/16* (2006.01)
*G02B 27/01* (2006.01)
*H04N 9/31* (2006.01)
*G09G 3/34* (2006.01)
*G09G 3/02* (2006.01)
*G09G 3/32* (2016.01)
(Continued)

(52) U.S. Cl.
CPC ....... *G09G 3/2022* (2013.01); *G02B 27/0101* (2013.01); *G02B 27/0172* (2013.01); *G06F 1/1639* (2013.01); *G09G 3/02* (2013.01); *G09G 3/2003* (2013.01); *G09G 3/32* (2013.01); *G09G 3/3413* (2013.01); *H04N 9/3129* (2013.01);
(Continued)

(58) Field of Classification Search
CPC .............. G02B 27/0101; G02B 27/017; G02B 26/105; G02B 30/26; G02B 27/0093; G09G 3/002; G09G 3/02; G09G 3/025; G09G 3/2018; G09G 3/2022; G09G 3/3413; G09G 3/2003; G09G 2310/0235; G09G 3/32; G09G 2330/025; G09G 2320/043; G06F 3/011; G06F 1/1639; H04N 9/3129; H04N 13/31; H04N 13/324; H04N 13/366; H04N 13/354; H04N 13/38; H04N 13/359;
(Continued)

(56) References Cited

U.S. PATENT DOCUMENTS 8,542,167 B2 * 9/2013 Chiou ................ G03B 21/2033
345/84
2002/0135553 A1 9/2002 Nagai et al.
(Continued)

OTHER PUBLICATIONS

PCT International Search Report and Written Opinion, PCT Application No. PCT/US2020/031371, dated Jul. 9, 2020, 11 pages.

*Primary Examiner* — Darlene M Ritchie
(74) *Attorney, Agent, or Firm* — Fenwick & West LLP

(57) ABSTRACT

Embodiments relate to driving first light emitting diodes (LEDs) of a first color to emit light during first subframes of emission frames, driving second LEDs of a second color to emit light during second subframes of emission frames, and driving third LEDs of a third color to emit light during the second subframes of emission frames. Light emitted from the first, second, and third LEDs is directed onto a mirror that reflects the light onto a plurality of pixel locations of an image field. The first, second, and third LEDs are aligned on an array of LEDs such that the first LEDs are at a first distance away from the second LEDs, and the first LEDs are at a second distance away from the third LEDs.

16 Claims, 12 Drawing Sheets

(51) Int. Cl.
  *G02B 26/10*     (2006.01)
  *G06F 3/01*      (2006.01)
(52) U.S. Cl.
  CPC ............ *G02B 26/105* (2013.01); *G06F 3/011* (2013.01); *G09G 2310/0235* (2013.01); *G09G 2320/043* (2013.01); *G09G 2330/025* (2013.01)
(58) Field of Classification Search
  CPC .. H04N 13/315; H04N 13/305; H04N 13/376; H04N 2013/40
  See application file for complete search history.

(56) References Cited

U.S. PATENT DOCUMENTS

| | | | |
|---|---|---|---|
| 2003/0210213 A1* | 11/2003 | Wu | H04N 9/315 345/82 |
| 2005/0168710 A1 | 8/2005 | Miyazawa et al. | |
| 2006/0044297 A1* | 3/2006 | Furukawa | H04N 9/3129 345/204 |
| 2009/0128786 A1* | 5/2009 | Lieb | G03B 21/14 353/121 |
| 2009/0179848 A1* | 7/2009 | Schmidt | G09G 3/3413 345/102 |
| 2012/0280972 A1* | 11/2012 | Champion | G02B 27/104 345/214 |
| 2015/0130853 A1* | 5/2015 | Hada | H04N 9/3155 345/690 |
| 2015/0302805 A1* | 10/2015 | Miyata | G02B 27/0101 345/690 |
| 2016/0181337 A1* | 6/2016 | Gu | H01L 27/3248 257/40 |
| 2017/0336677 A1* | 11/2017 | Ajichi | G02F 1/133609 |

\* cited by examiner

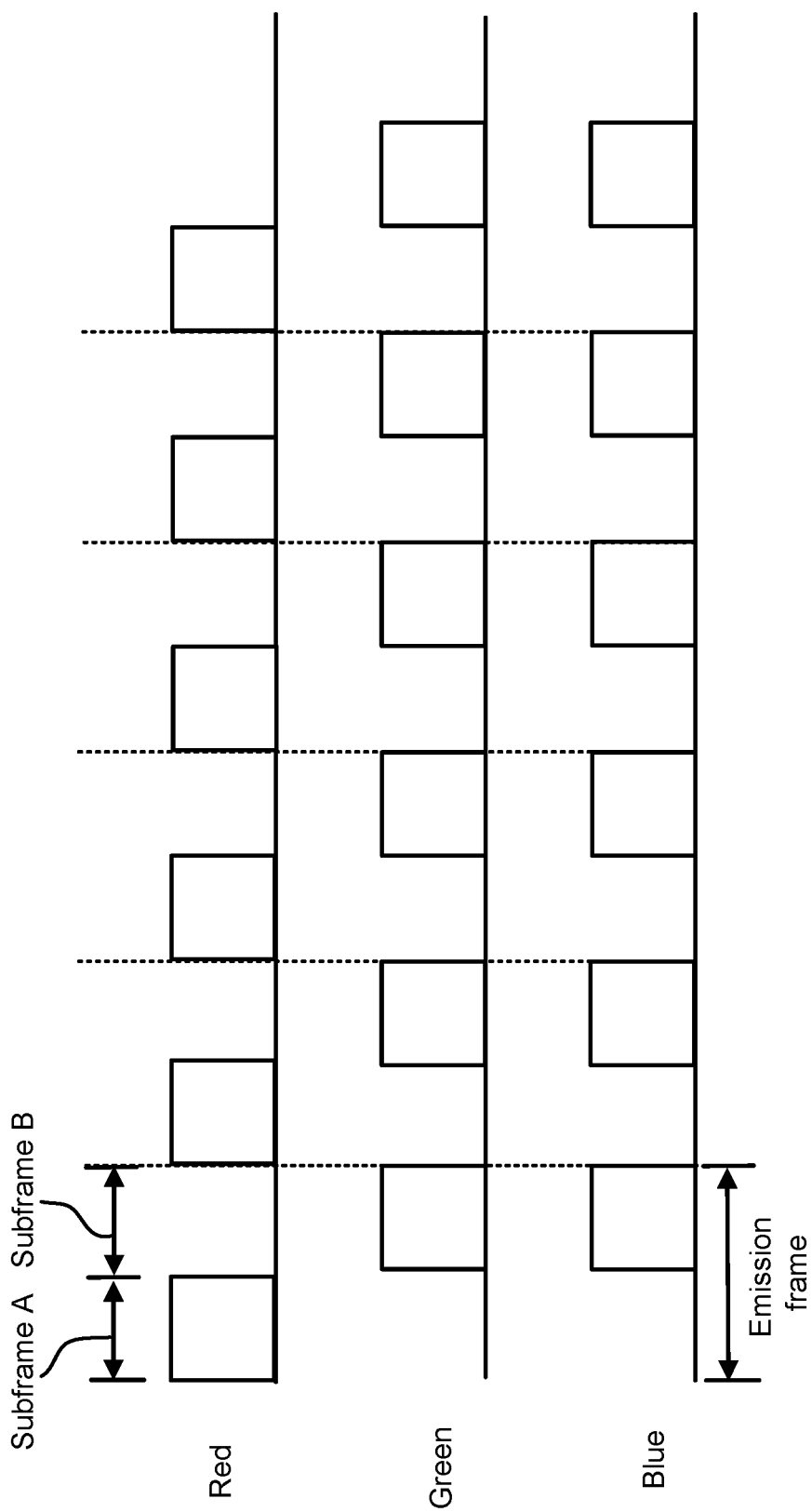

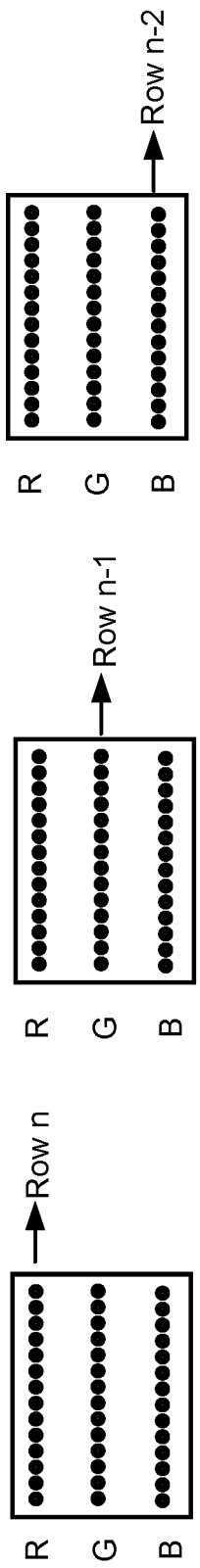
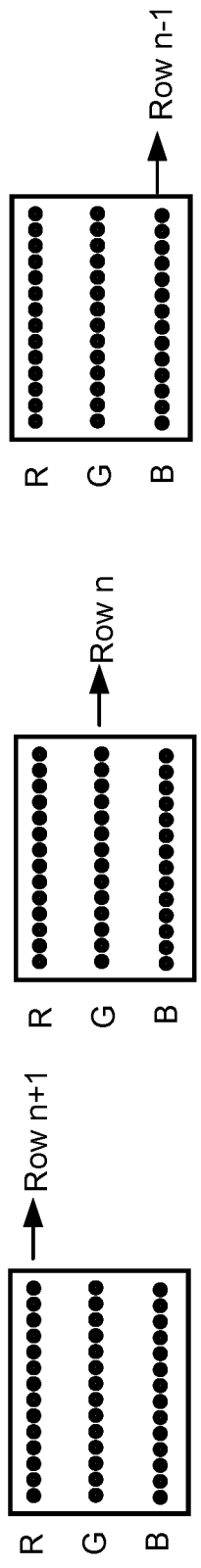
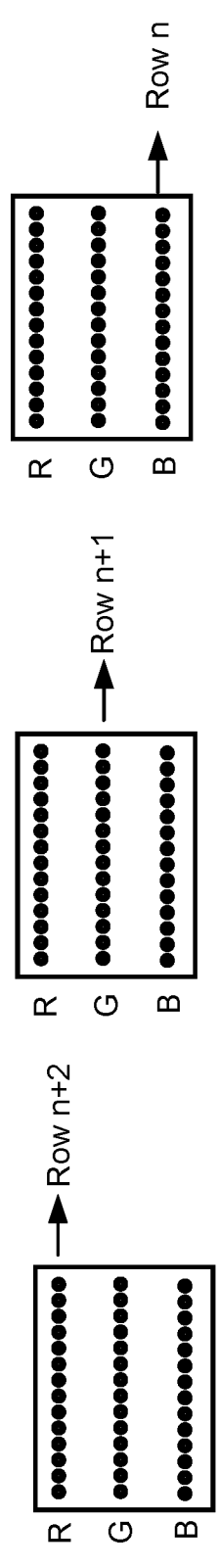
FIG. 8A
FIG. 8B
FIG. 8C

US 10,861,373 B2

REDUCING PEAK CURRENT USAGE IN LIGHT EMITTING DIODE ARRAY

CROSS REFERENCE TO RELATED APPLICATION

This application claims the benefit of Greek Patent Application No. 20190100204, filed May 9, 2019, which is incorporated by reference in its entirety.

BACKGROUND

This disclosure relates to a display device, and specifically to a display device with at least a subset of light emitting diodes (LEDs) turned on at different times to reduce peak current.

A display device is often used in a virtual reality (VR) or augmented-reality (AR) system as a head-mounted display or a near-eye display. The display device typically includes an array of LEDs that emits light to the eyes of the viewer, and an optical block positioned between the display and the eyes. The optical block includes optical components that receive light emitted from the array and adjust an orientation of the light such that the light is projected onto an image field to form an image. To display an image via the display device, the array of LEDs emits light, and the light is projected onto pixel locations on the image field.

In a given display device, the array of LEDs may include a large number of LEDs (e.g., 2560 LEDs) for each of the colors used to display an image (e.g., Red, Blue, Green) and turning on all of the LEDs (e.g., 7,680 LEDs) in the array simultaneously consumes a large amount of instantaneous current. When a large amount of current is required to drive the array of LEDs, a complicated system design of the display device may be needed to supply the driving current to the array of LEDs. However, developing and manufacturing a complicated system design is a time intensive and costly process. Further, when a large amount of current is used to operate the display device, there is a risk of degraded silicon performance, which can lead to increase in defective products and shorter lifetime of the display device.

SUMMARY

Embodiments relate to projecting light from an array of LEDs onto an image field to display an image to a user. Light emitted from the array of LEDs may be directed to a rotating mirror and redirected to the image field by the rotating mirror that is positioned in between the array of LEDs and the image field. Depending on the orientation of the mirror, light is directed to illuminate a particular subset of pixel locations on the image field. As the mirror rotates, light is projected onto different subsets of the pixel locations, and an image is generated on the image field when the mirror scans through the entire image field. The array of LEDs may include a plurality of LEDs (e.g., 2560 LEDs) for each color (e.g., red, blue, green) that are arranged such that LEDs of a same color are in a same row. When driving the array of LEDs to emit light, different subsets of LEDs are turned on at different subframes of an emission frame to reduce current usage at a given time.

In some embodiments, each emission frame for operating the array of LEDs is divided into two subframes. During a first subframe, first LEDs are turned on to emit light of a first color (e.g., red) while second LEDs of a second color (e.g., green) and third LEDs of a third color (e.g., blue) are turned off. During a second subframe following the first subframe, the first LEDs are turned off while the second LEDs and the third LEDs are turned on. The row of first LEDs is at a first distance away from the row of second LEDs, and the row of third LEDs is at a second distance away from the row of second LEDs, where the first distance and the second distance are different. The first distance and the second distance are determined based at least on emission timing of first subframe and the second subframe such that light emitted from the first LEDs, second LEDs, and third LEDs are projected onto the appropriate pixel locations.

In some embodiments, each emission frame is divided into three subframes. During a first subframe, first LEDs are turned on while second LEDs and third LEDs are turned off. During a second subframe, second LEDs are turned on while first LEDs and third LEDs are turned off. During a third subframe, third LEDs are turned on while first LEDs and second LEDs are turned off. The row of first LEDs is at a first distance away from the row of second LEDs, and the row of third LEDs is at a second distance away from the row of second LEDs, where the first distance and the second distance are equal.

BRIEF DESCRIPTION OF DRAWINGS

FIG. 6A is a timing diagram illustrating emission patterns of LEDs with two subframes in a single frame, in accordance with an embodiment.

FIGS. 8A-8C are conceptual diagrams illustrating rows onto which LEDs project light for emission frames with three subframes, in accordance with an embodiment.

The figures depict embodiments of the present disclosure for purposes of illustration only.

DETAILED DESCRIPTION

Embodiments relate to operating a display device to reduce peak current usage by an array of LEDs of the display device used to display images. Instead of turning on all of the LEDs on the array at the same time when displaying an image, first LEDs of a first color are driven to emit light during first subframes of emission frames while second LEDs of a second color are disabled. During second subframes of the same emission frames, second LEDs are driven to emit light while first LEDs are disabled.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
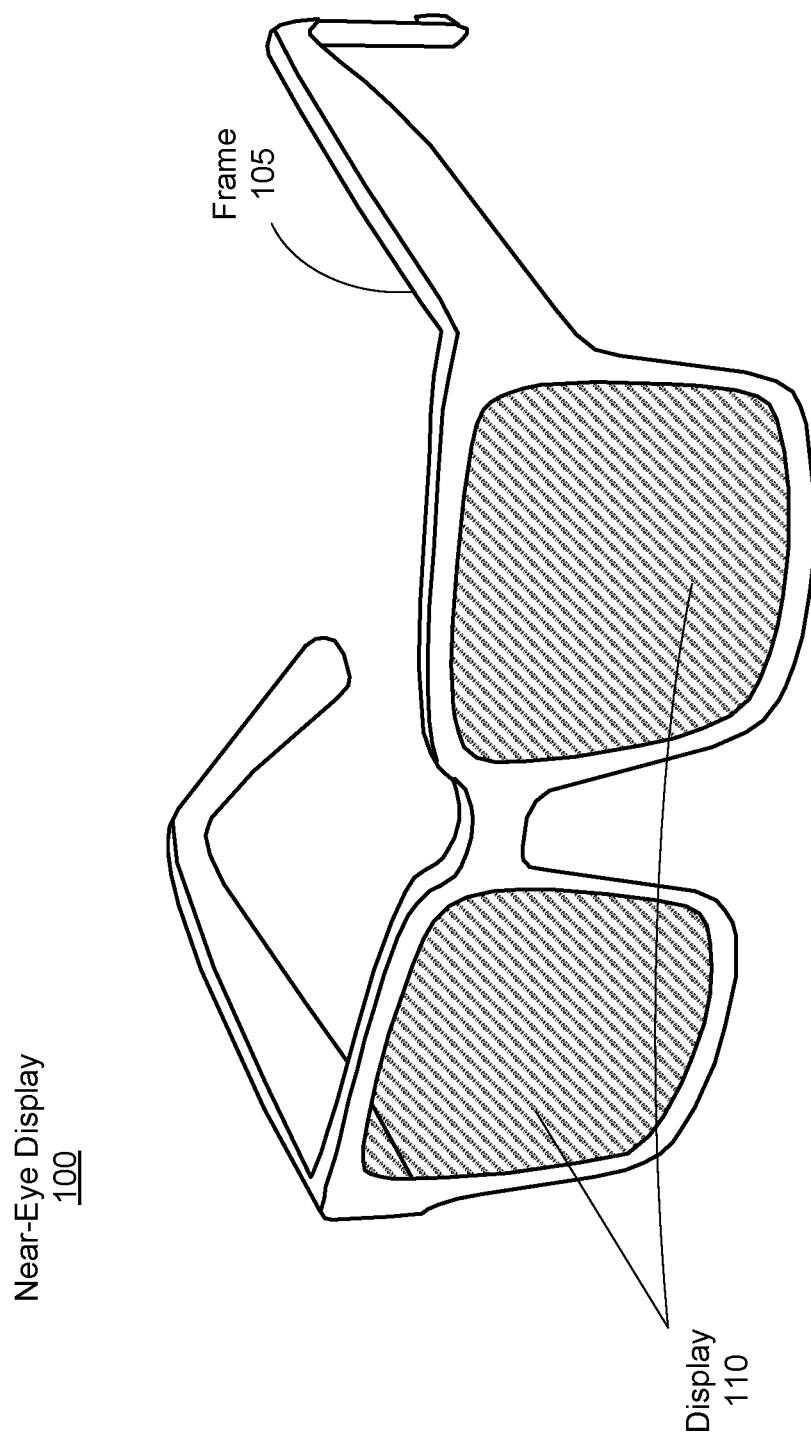
FIG. 1 is a perspective view of a near-eye-display (NED), in accordance with an embodiment.

Figure (FIG. 1 is a diagram of a near-eye display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least a source assembly to generate an image light to present media to an eye of the user. The source assembly includes, e.g., a light source, an optics system, or some combination thereof.

FIG. 1 is only an example of a VR system. However, in alternate embodiments, FIG. 1 may also be referred to as a Head-Mounted-Display (HMD).

Figure 2:
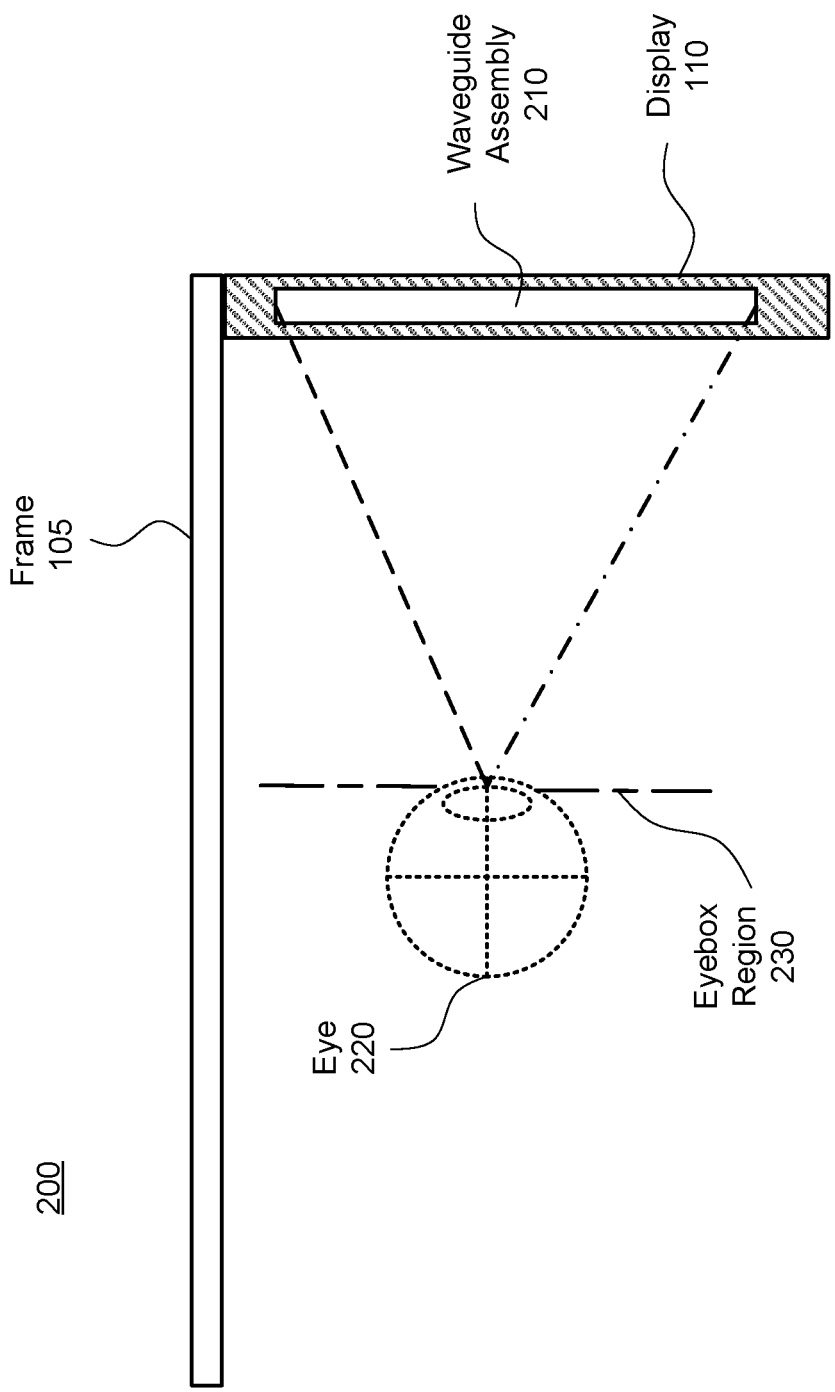
FIG. 2 is a cross-sectional diagram of an eyewear of the NED illustrated in FIG. 1, in accordance with an embodiment.

FIG. 2 is a cross sectional diagram 200 of the NED 100 illustrated in FIG. 1, in accordance with an embodiment. The cross section 200 illustrates at least one waveguide assembly 210. An exit pupil is a location where the eye 220 is positioned in an eyebox region 230 when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, directs the image light to the eye 220 through the exit pupil. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act (e.g., correct aberrations in image light emitted from the waveguide assembly 210) to magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light. In one embodiment, the waveguide assembly 210 may produce and direct many pupil replications to the eyebox region 230, in a manner that will be discussed in further detail below in association with FIG. 5B.

Figure 3A:
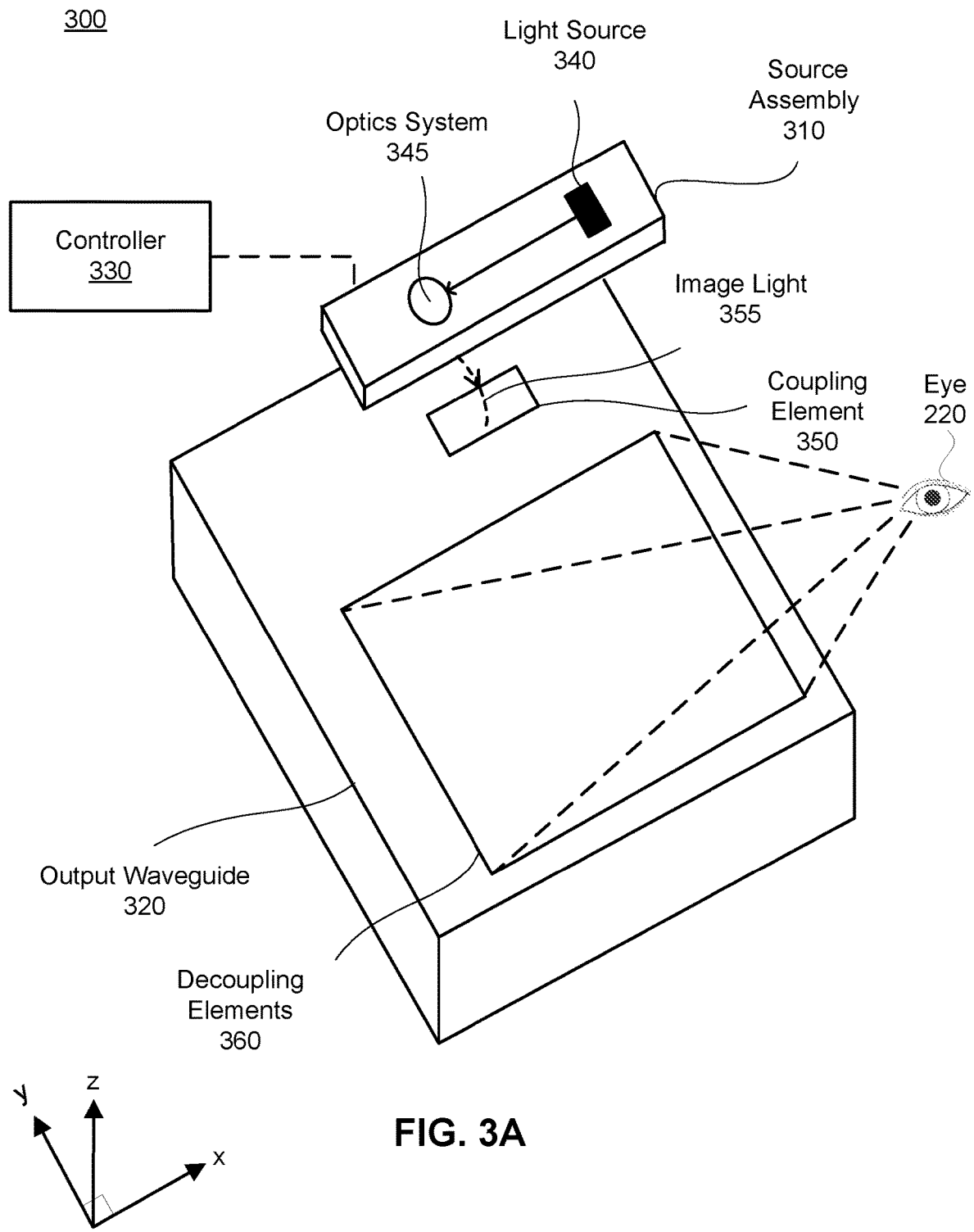
FIG. 3A is a perspective view of a display device, in accordance with an embodiment.

FIG. 3A illustrates a perspective view of a display device 300, in accordance with an embodiment. In some embodiments, the display device 300 is a component (e.g., the waveguide assembly 210 or part of the waveguide assembly 210) of the NED 100. In alternative embodiments, the display device 300 is part of some other NEDs, or another system that directs display image light to a particular location. Depending on embodiments and implementations, the display device 300 may also be referred to as a waveguide display and/or a scanning display. However, in other embodiments, the display device 300 does not include a scanning mirror. For example, the display device 300 can include matrices of light emitters that project light on an image field through a waveguide but without a scanning mirror. In another embodiment, the image emitted by the two-dimensional matrix of light emitters may be magnified by an optical assembly (e.g., lens) before the light arrives a waveguide or a screen.

For a particular embodiment that uses a waveguide and an optical system, the display device 300 may include a source assembly 310, an output waveguide 320, and a controller 330. The display device 300 may provide images for both eyes or for a single eye. For purposes of illustration, FIG. 3A shows the display device 300 associated with a single eye 220. Another display device (not shown), separated (or partially separated) from the display device 300, provides image light to another eye of the user. In a partially separated system, one or more components may be shared between display devices for each eye.

The source assembly 310 generates image light 355. The source assembly 310 includes a light source 340 and an optics system 345. The light source 340 is an optical component that generates image light using a plurality of light emitters arranged in a matrix. Each light emitter may emit monochromatic light. The light source 340 generates image light including, but not restricted to, Red image light, Blue image light, Green image light, infra-red image light, etc. While RGB is often discussed in this disclosure, embodiments described herein are not limited to using red, blue and green as primary colors. Other colors are also possible to be used as the primary colors of the display device. Also, a display device in accordance with an embodiment may use more than three primary colors.

The optics system 345 performs a set of optical processes, including, but not restricted to, focusing, combining, conditioning, and scanning processes on the image light generated by the light source 340. In some embodiments, the optics system 345 includes a combining assembly, a light conditioning assembly, and a scanning mirror assembly, as described below in detail in conjunction with FIG. 3B. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. The pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 are controlled by changing an orientation and position of the image light 355 entering the coupling element 350. The pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the image rendering operations of the source assembly 310. The controller 330 determines instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters, or some combination thereof. The controller 330 includes a combination of hardware, software, and/or firmware not shown here so as not to obscure other aspects of the disclosure.

Figure 3B:
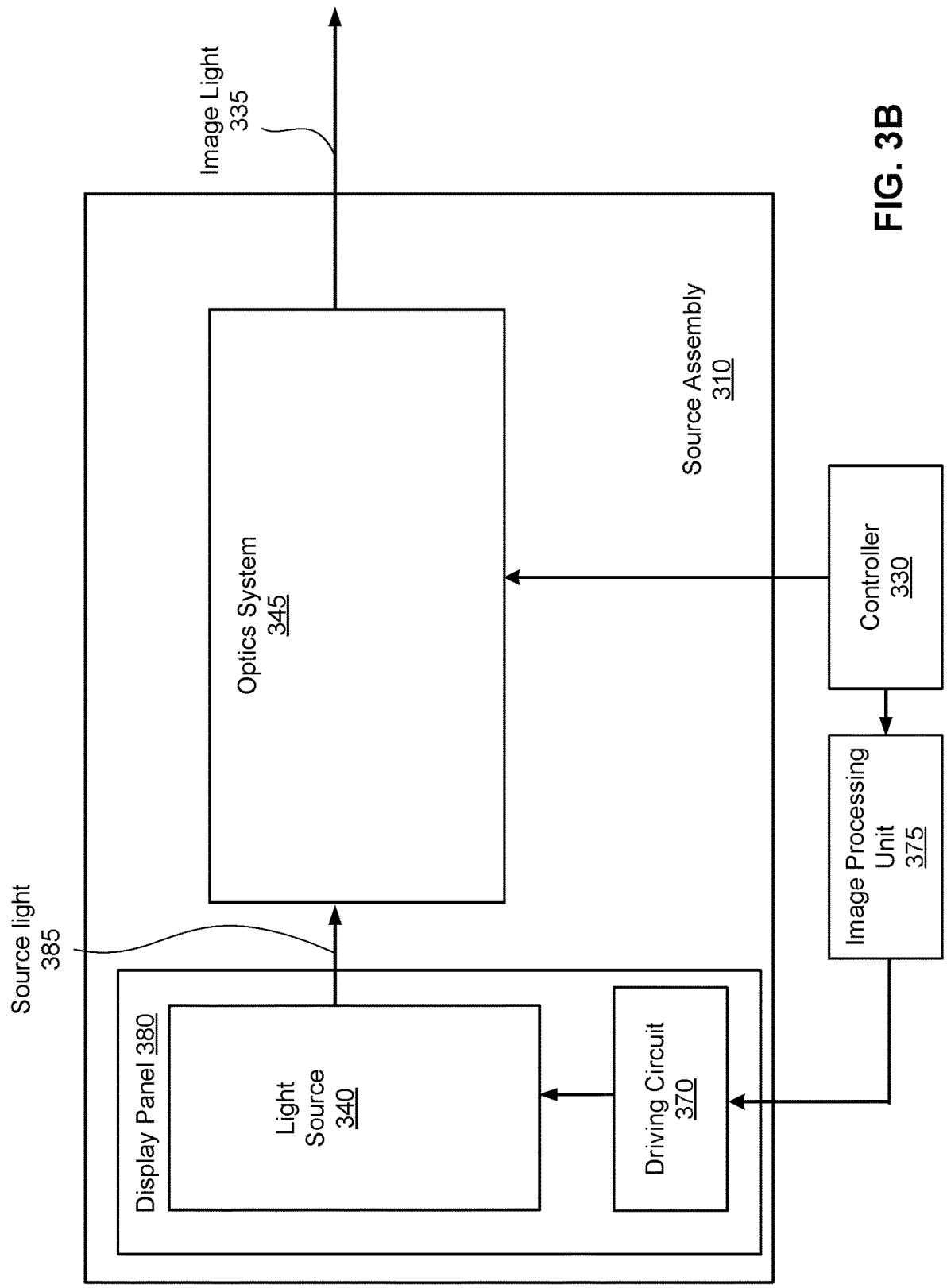
FIG. 3B illustrates a block diagram of a source assembly, in accordance with an embodiment.

FIG. 3B is a block diagram illustrating an example source assembly 310, in accordance with an embodiment. The source assembly 310 includes the light source 340 that emits light that is processed optically by the optics system 345 to generate image light 335 that will be projected on an image field (not shown). The light source 340 is driven by the driving circuit 370 based on the data sent from a controller 330 or an image processing unit 375. In one embodiment, the driving circuit 370 is the circuit panel that connects to and mechanically holds various light emitters of the light source 340. The driving circuit 370 and the light source 340 combined may sometimes be referred to as a display panel 380 or an LED panel (if some forms of LEDs are used as the light emitters).

The light source 340 may generate a spatially coherent or a partially spatially coherent image light. The light source 340 may include multiple light emitters. The light emitters can be vertical cavity surface emitting laser (VCSEL) devices, light emitting diodes (LEDs), microLEDs, tunable lasers, and/or some other light-emitting devices. In one embodiment, the light source 340 includes a matrix of light emitters. In another embodiment, the light source 340 includes multiple sets of light emitters with each set grouped by color and arranged in a matrix form. The light source 340 emits light in a visible band (e.g., from about 390 nm to 700 nm). The light source 340 emits light in accordance with one or more illumination parameters that are set by the controller 330 and potentially adjusted by image processing unit 375 and driving circuit 370. An illumination parameter is an instruction used by the light source 340 to generate light. An illumination parameter may include, e.g., source wavelength, pulse rate, pulse amplitude, beam type (continuous or pulsed), other parameter(s) that affect the emitted light, or some combination thereof. The light source 340 emits source light 385. In some embodiments, the source light 385 includes multiple beams of red light, green light, and blue light, or some combination thereof.

The optics system 345 may include one or more optical components that optically adjust and potentially re-direct the light from the light source 340. One form of example adjustment of light may include conditioning the light. Conditioning the light from the light source 340 may include, e.g., expanding, collimating, correcting for one or more optical errors (e.g., field curvature, chromatic aberration, etc.), some other adjustment of the light, or some combination thereof. The optical components of the optics system 345 may include, e.g., lenses, mirrors, apertures, gratings, or some combination thereof. Light emitted from the optics system 345 is referred to as an image light 355.

The optics system 345 may redirect image light 335 via its one or more reflective and/or refractive portions so that the image light 355 is projected at a particular orientation toward the output waveguide 320 (shown in FIG. 3A). Where the image light is redirected toward is based on specific orientations of the one or more reflective and/or refractive portions. In some embodiments, the optics system 345 includes a single scanning mirror that scans in at least two dimensions. In other embodiments, the optics system 345 may include a plurality of scanning mirrors that each scan in orthogonal directions to each other. The optics system 345 may perform a raster scan (horizontally, or vertically), a biresonant scan, or some combination thereof. In some embodiments, the optics system 345 may perform a controlled vibration along the horizontal and/or vertical directions with a specific frequency of oscillation to scan along two dimensions and generate a two-dimensional projected line image of the media presented to user's eyes. In other embodiments, the optics system 345 may also include a lens that serves similar or same function as one or more scanning mirror.

In some embodiments, the optics system 345 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 355. The image light 355 from the galvanometer mirror represents a two-dimensional line image of the media presented to the user's eyes.

In some embodiments, the source assembly 310 does not include an optics system. The light emitted by the light source 340 is projected directly to the waveguide 320 (shown in FIG. 3A).

The controller 330 controls the operations of light source 340 and, in some cases, the optics system 345. In some embodiments, the controller 330 may be the graphics processing unit (GPU) of a display device. In other embodiments, the controller 330 may be other kinds of processors. The operations performed by the controller 330 includes taking content for display, and dividing the content into discrete sections. The controller 330 instructs the light source 340 to sequentially present the discrete sections using light emitters corresponding to a respective row in an image ultimately displayed to the user. The controller 330 instructs the optics system 345 to perform different adjustment of the light. For example, the controller 330 controls the optics system 345 to scan the presented discrete sections to different areas of a coupling element of the output waveguide 320 (shown in FIG. 3A). Accordingly, at the exit pupil of the output waveguide 320, each discrete portion is presented in a different location. While each discrete section is presented at different times, the presentation and scanning of the discrete sections occur fast enough such that a user's eye integrates the different sections into a single image or series of images. The controller 330 may also provide scanning instructions to the light source 340 that include an address corresponding to an individual source element of the light source 340 and/or an electrical bias applied to the individual source element.

The image processing unit 375 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, the image processing unit 375 may be one or more circuits that are dedicated to performing certain features. While in FIG. 3B the image processing unit 375 is shown as a stand-alone unit that is separate from the controller 330 and the driving circuit 370, in other embodiments the image processing unit 375 may be a sub-unit of the controller 330 or the driving circuit 370. In other words, in those embodiments, the controller 330 or the driving circuit 370 performs various image processing procedures of the image processing unit 375. The image processing unit 375 may also be referred to an as image processing circuit.

Light Emitting Diode Array

Figure 4:
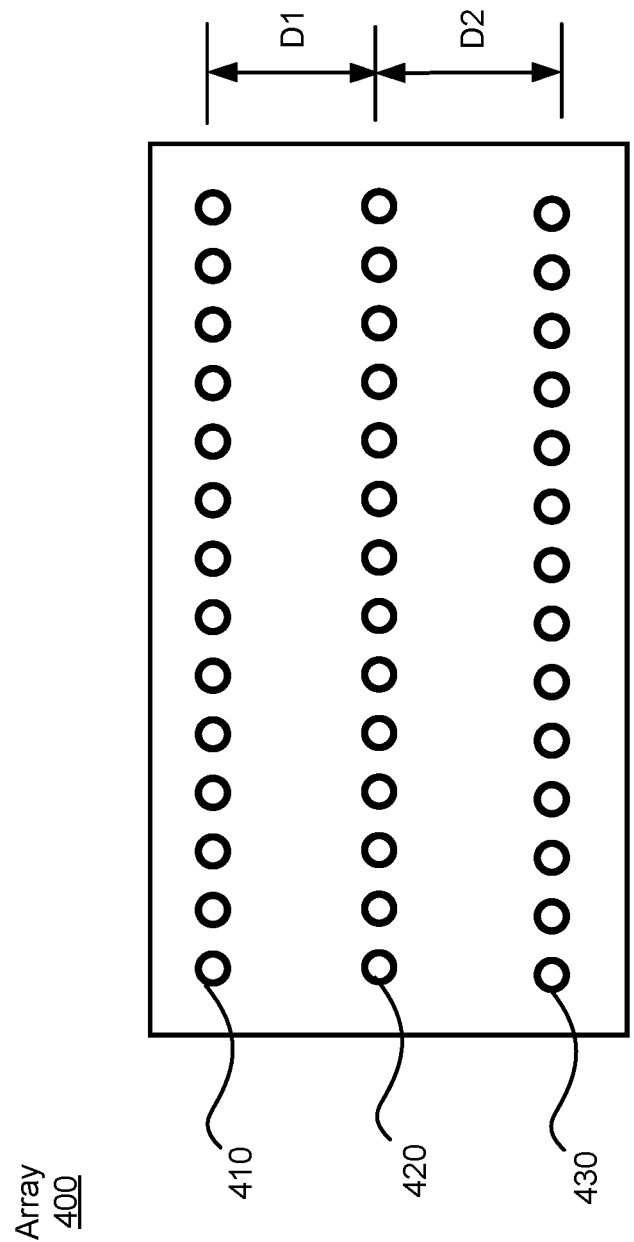
FIG. 4 is a diagram illustrating an array of light emitting diodes (LEDs), in accordance with an embodiment.

FIG. 4 is a top view of an array 400 of light emitting diodes (LEDs) that may be included in the light source 340 of FIGS. 3A and 3B, in accordance with an embodiment. The array 400 includes a plurality of LEDs that are organized into rows and columns. In the example shown in FIG. 4, the array 400 includes red LEDs 410, green LEDs 420, and blue LEDs 430 that are disposed such that LEDs of the same color are in the same row. The green LEDs 420 are aligned along the red LEDs 410 such that the red LEDs 410 disposed on one side of the green LEDs 420. The blue LEDs 430 are placed along a line parallel to the red LEDs 410 and green LEDs 420, and the blue LEDs 430 are placed on an opposite side of the green LEDs 420 with respect to the red LEDs 410.

The row of red LEDs 410 is at a first distance D1 from the row of green LEDs 420, and the row of blue LEDs 430 is at a second distance D2 from the row of green LEDs 420. The first distance D1 and the second distance D2 is correlated with at least on a number of subframes of an emission frame during display mode, as described in detail below with respect to FIGS. 6A and 6B. The first distance D1 and the second distance D2 may be equal or different from each other. Although not shown in FIG. 4, various other configurations of LEDs are also within the scope of the present disclosure. For example, the array 400 may include different colored LEDs, may have different color arrangements, and/or additional rows of LEDs for each color.

While the LEDs shown in FIG. 4 are arranged in rows and columns perpendicular to rows, in other embodiments, the LEDs on the array 400 may be arranged in other forms. For example, some of the LEDs may be aligned diagonally or in other arrangement, regular or irregular, symmetrical or asymmetrical. Also, the terms rows and columns may describe two relative spatial relationships of elements. While, for the purpose of simplicity, a column described herein is normally associated with a vertical line of elements, it should be understood that a column does not have to be arranged vertically (or longitudinally). Likewise, a row does not have to be arranged horizontally (or laterally). A row and a column may also sometimes describe an arrangement that is non-linear. Rows and columns also do not necessarily imply any parallel or perpendicular arrangement. Sometimes a row or a column may be referred to as a line. In other embodiments, there may be two or more lines of LEDs for each color. In some embodiments, the number of lines of LEDs vary from color to color based on a brightness of each color. For example, red LEDs may be brighter than blue LEDs. To compensate for the difference in brightness in an array, there may be 2 lines of red LEDs and 5 lines of blue LEDs on the array.

In one embodiment, the LEDs may be microLEDs. In other embodiments, other types of light emitters such as vertical-cavity surface-emitting lasers (VCSELs) may be used. A "microLED" may be a particular type of LED having a small active light emitting area (e.g., less than 2,000 $\mu m^2$ in some embodiments, less than 20 $\mu m^2$ or less than 10 $\mu m^2$ in other embodiments). In some embodiments, the emissive surface of the microLED may have a diameter of less than approximately 5 μm, although smaller (e.g., 2 μm) or larger diameters for the emissive surface may be utilized in other embodiments. The microLED may also have collimated or non-Lambertian light output, in some examples, which may increase the brightness level of light emitted from a small active light-emitting area.

Example Formation of an Image

Figure 5A:
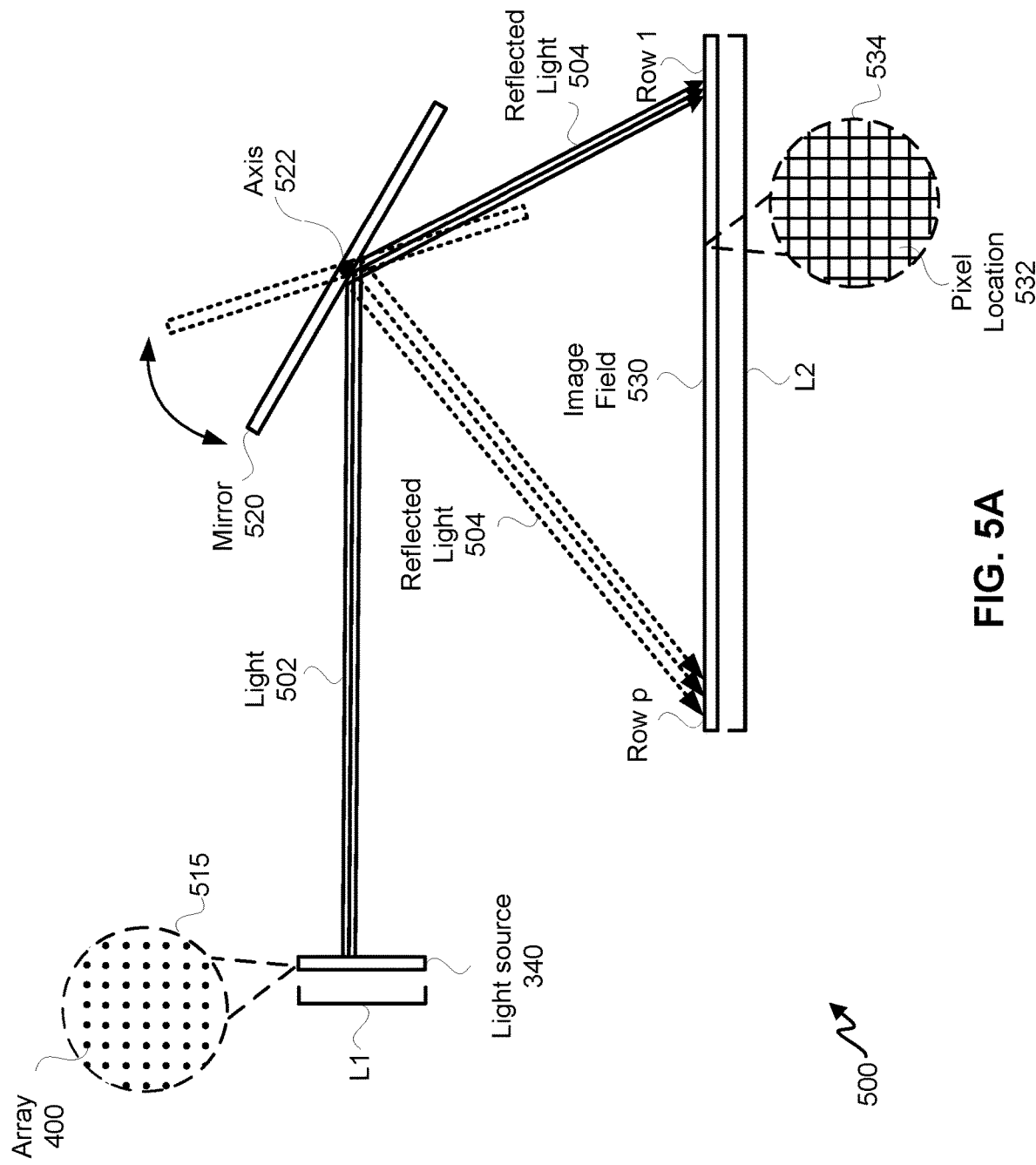
FIG. 5A is a diagram illustrating projection of light emitted from LEDs onto an image field, in accordance with an embodiment.

FIG. 5A is a diagram illustrating projection of light emitted from LEDs onto an image field, in accordance with an embodiment. FIG. 5A illustrate how images are formed in a display device using light emitted from the light source 340. An image field is an area that receives the light emitted by the light source 340 and forms an image. For example, an image field may correspond to a portion of the coupling element 350 or a portion of the decoupling element 360 in FIG. 3A. In some cases, an image field is not an actual physical structure but is an area to which the image light is projected and which the image is formed. In one embodiment, the image field is a surface of the coupling element 350 and the image formed on the image field is magnified as light travels through the output waveguide 320. In another embodiment, an image field is formed after light passing through the waveguide which combines the light of different colors to form the image field. In some embodiments, the image field may be projected directly into the user's eyes.

During a scanning operation, a display device 500 uses a scanning mirror 520 to project light from a light source 340 to an image field 530. The display device 500 may correspond to the near-eye display 100 or another scan-type display device. The light source 340 may correspond to the light source 340 shown in FIG. 3B, or may be used in other display devices. The light source 340 includes an array 400 with multiple rows and columns of light emitting devices, as represented by the dots in inset 515. In one embodiment, the light source 340 may include a single line of light emitting diodes for each color. In other embodiments, the light source 340 may include more than one line of LEDs for each color. The light 502 emitted by the light source 340 may be a set of collimated beams of light. For example, the light 502 in FIG. 5A shows multiple beams that are emitted by rows of LEDs. Before reaching the mirror 520, the light 502 may be conditioned by different optical devices such as a conditioning assembly. The mirror 520 reflects and projects the light 502 from the light source 340 to the image field 530. The mirror 520 rotates about an axis 522. The mirror 520 may be a microelectromechanical system (MEMS) mirror or any other suitable mirror. The mirror 520 may be an embodiment of the optics system 345 in FIG. 3B or a part of the optics system 345. As the mirror 520 rotates, the light 502 is directed to a different part of the image field 530, as illustrated by the reflected part of the light 504 in solid lines and the reflected part of the light 504 in dash lines.

At a particular orientation of the mirror 520 (i.e., a particular rotational angle), the array 400 illuminates a portion of the image field 530 (e.g., a particular subset of multiple pixel locations 532 on the image field 530). In one embodiment, the LEDs are arranged and spaced such that a light beam from each LED is projected on a corresponding pixel location 532. The distance between adjacent rows of LEDs are described with respect to FIGS. 6A and 6B. In another embodiment, small light emitters such as microLEDs are used for LEDs so that light beams from a subset of multiple light emitters are together projected at the same pixel location 532. In other words, a subset of multiple LEDs collectively illuminates a single pixel location 532 at a time.

The image field 530 may also be referred to as a scan field because, when the light 502 is projected to an area of the image field 530, the area of the image field 530 is being illuminated by the light 502. The image field 530 may be spatially defined by a matrix of pixel locations 532 (represented by the blocks in inset 534) in rows and columns. A pixel location here refers to a single pixel. The pixel locations 532 (or simply the pixels) in the image field 530 sometimes may not actually be additional physical structure. Instead, the pixel locations 532 may be spatial regions that divide the image field 530. Also, the sizes and locations of the pixel locations 532 may depend on the projection of the light 502 from the light source 340. For example, at a given angle of rotation of the mirror 520, light beams emitted from the light source 340 may fall on an area of the image field 530. As such, the sizes and locations of pixel locations 532 of the image field 530 may be defined based on the location of each light beam. In some cases, a pixel location 532 may be subdivided spatially into subpixels (not shown). For example, a pixel location 532 may include a red subpixel, a green subpixel, and a blue subpixel. The red subpixel corresponds to a location at which one or more red light beams are projected, etc. When subpixels are present, the color of a pixel 532 is based on the temporal and/or spatial average of the subpixels.

The number of rows and columns of LEDs in the array 400 of the light source 340 may or may not be the same as the number of rows and columns of the pixel locations 532 in the image field 530. In one embodiment, the number of LEDs in a row in the array 400 is equal to the number of pixel locations 532 in a row of the image field 530 while the number of LEDs in the array 400 in a column is two or more but fewer than the number of pixel locations 532 in a column of the image field 530. Put differently, in such embodiment, the light source 340 has the same number of columns of LEDs in the array 400 as the number of columns of pixel locations 532 in the image field 530 but has fewer rows than the image field 530. For example, in one specific embodiment, the light source 340 has about 1280 columns of LEDs in the array 400, which is the same as the number of columns of pixel locations 532 of the image field 530, but only 3 rows of LEDs. The light source 340 may have a first length L1, which is measured from the first row to the last row of LEDs. The image field 530 has a second length L2, which is measured from row 1 to row p of the scan field 530. In one embodiment, L2 is greater than L1 (e.g., L2 is 50 to 10,000 times greater than L1).

Since the number of rows of pixel locations 532 is larger than the number of rows of LEDs in the array 400 in some embodiments, the display device 500 uses the mirror 520 to project the light 502 to different rows of pixels at different times. As the mirror 520 rotates and the light 502 scans through the image field 530 quickly, an image is formed on the image field 530. In some embodiments, the light source 340 also has a smaller number of columns than the image field 530. The mirror 520 can rotate in two dimensions to fill the image field 530 with light (e.g., a raster-type scanning down rows then moving to new columns in the image field 530).

The display device may operate in predefined display periods. A display period may correspond to a duration of time in which an image is formed. For example, a display period may be associated with the frame rate (e.g., a reciprocal of the frame rate) representing the frequency that an emission frame is repeated within a given time (e.g., 1 second). In the particular embodiment of display device 500 that includes a rotating mirror, the display period may also be referred to as a scanning period. A complete cycle of rotation of the mirror 520 may be referred to as a scanning period. A scanning period herein refers to a predetermined cycle time during which the entire image field 530 is completely scanned. The scanning period may be divided into a plurality of emission frames, each emission frame corresponding to light projected onto a particular subset of pixel locations on the image field 530 (e.g., three rows of pixel locations on the image field). The scanning of the image field 530 is controlled by the mirror 520. The light generation of the display device 500 may be synchronized with the rotation of the mirror 520. For example, in one embodiment, the movement of the mirror 520 from an initial position that projects light to row 1 of the image field 530, to the last position that projects light to row p of the image field 530, and then back to the initial position is equal to a scanning period. The scanning period may also be related to the frame rate of the display device 500. By completing a scanning period, an image (e.g., a frame) is formed on the image field 530 per scanning period. Hence, the frame rate may correspond to the number of scanning periods in a second.

As the mirror 520 rotates, light scans through the image field and images are formed. The actual color value and light intensity (brightness) of a given pixel location 532 may be an average of the color various light beams illuminating the pixel location during the scanning period. After completing a scanning period, the mirror 520 reverts back to the initial position to project light onto the first few rows of the image field 530 again, except that a new set of driving signals may be fed to the LEDs. The same process may be repeated as the mirror 520 rotates in cycles. As such, different images are formed in the scanning field 530 in different frames.

Figure 5B:
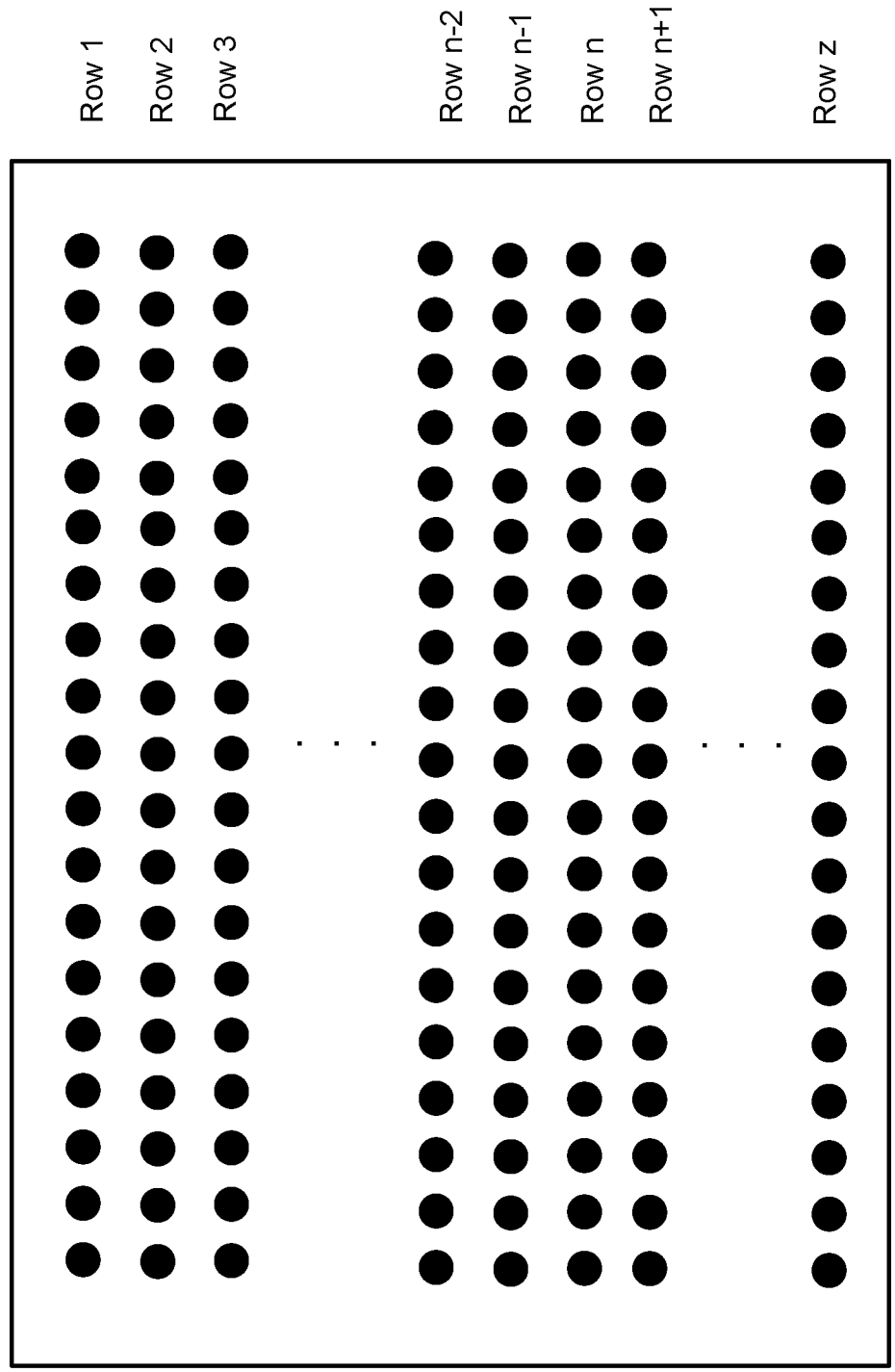
FIG. 5B is a diagram illustrating rows of pixel locations on an image field, in accordance with an embodiment.

FIG. 5B is a diagram illustrating rows of pixel locations on an image field, in accordance with an embodiment. The image field 530 may include rows of pixel locations, each row including a plurality of pixel locations. In the example shown in FIG. 5B, there are z rows on the image field 530. As the scanning mirror 520 rotates, light emitted from the array 400 is projected onto different portions of the image field 530 to illuminate different rows of the image field 530 at a given time.

In one embodiment, all of the LEDs on the array 400 are driven to turn on at the beginning of an emission frame and emit light during an emission period that corresponds to a first half of the emission frame. During the emission period, light emitted from the array 400 is projected onto the first three rows of pixel locations (e.g., Row 1, Row 2, Row 3) on the image field 530. For example, red light emitted from the red LEDs 410 is projected onto Row 1, green light emitted from the green LEDs 420 is projected onto Row 2, and blue light emitted from the blue LEDs 430 is projected onto Row 3. After the emission frame, the mirror 520 rotates such that in a subsequent emission frame, light emitted from the array 400 is projected onto three rows of pixel locations on the image field 530 offset by one row compared to the previous emission frame. For example, red light is now projected onto Row 2, green light is projected onto Row 3, and blue light is projected onto Row 4.

However, when all the LEDs on the array 400 are driven to emit light at the same time during the emission period, there is a large instantaneous current required to turn on all of the LEDs at the same time. But to provide the current necessary to turn on all the LEDs of the array 400 at the same time, the near-eye display 100 may be bulky because it needs a large current source and becomes expensive due to the high cost of designing and manufacturing. Further, there is an increased risk of silicon not functioning properly over time due to being operated with high current as well as safety risk due to a large thermal budget than cannot be sunk easily. To reduce peak current, a time division method may be used to divide each emission frame into subframes and turn on a different portion of the LEDs on the array 400 in each of the subframes instead of turning on all of the LEDs on the array 400 at the same time, as described below in detail with respect to FIGS. 6A and 6B.

FIG. 6A is a timing diagram illustrating emission patterns of LEDs where each emission frame has two subframes A, B, in accordance with an embodiment. A method of operating the array 400 is to turn on subsets of LEDs on the array 400 at different subframes of an emission frame. The controller 330 or the image processing unit 375 determines voltage values to apply to each of the LEDs 410 such that light emitted from the LEDs corresponds to a subpixel in a pixel location on the image field 530. In the example shown in FIG. 6A, a first subset of LEDs on the array 400 emits light during subframe A of the emission frame and a second subset of LEDs on the array 400 emits light during subframe B of the emission frame that follows subframe A. In one embodiment, the first subset of LEDs are red LEDs 410 and the second subset of LEDs are green LEDs 420 and blue LEDs 430. In another embodiment, the first subset of LEDs and the second subset of LEDs may have different colors. For example, the first subset of LEDs may be green LEDs 420 and the second subset of LEDs may be red LEDs 410 and blue LEDs 430.

In the timing diagram shown in FIG. 6A, the red LEDs 410 that are disposed on a first row of the array 400 emit light during subframe A of each emission frame. While the red LEDs 410 are turned on to emit light, the green LEDs 420 and the blue LEDs 430 are turned off. The green LEDs 420 are disposed on a second row of the array 400 and emit light during subframe B that follows subframe A during each emission frame. The blue LEDs 430 are disposed on a third row of the array 400 below the green LEDs 420 and emit light during subframe B at the same time as the green LEDs 420. While the green LEDs 420 and the blue LEDs 430 are turned on to emit light, the red LEDs 410 are turned off.

To generate an image on the image field 530, light emitted from the red LEDs 410, green LEDs 420, and blue LEDs 430 are projected onto the image field 530. Each pixel on the image field 530 is divided into a red subpixel, a green subpixel, and a blue subpixel. When all the LEDs on the array 400 emit light at the same time, the rows of LEDs on the array 400 are equal in between two adjacent rows.

However, when different portions of the LEDs are driven to emit light at different times, the distance between the rows on the array 400 need to compensate for the time delays to maintain image alignment on the image field 530. As shown in FIG. 4, the distance between red LEDs 410 and the green LEDs 420 is D1 and the distance between the green LEDs 420 and the blue LEDs 430 is D2, where the row of green LEDs 420 is between the row of red LEDs 410 and the row of blue LEDs 430. When the array 400 is configured to turn on red LEDs during subframe A and turn on green LEDs during subframe B, the distance D1 between the red LEDs 410 and the green LEDs 420 is equal to (n+1/2) times the distance D2 between the green LEDs 420 and the blue LEDs 430, where n is 0 or an integer greater than 0.

Figure 6B:
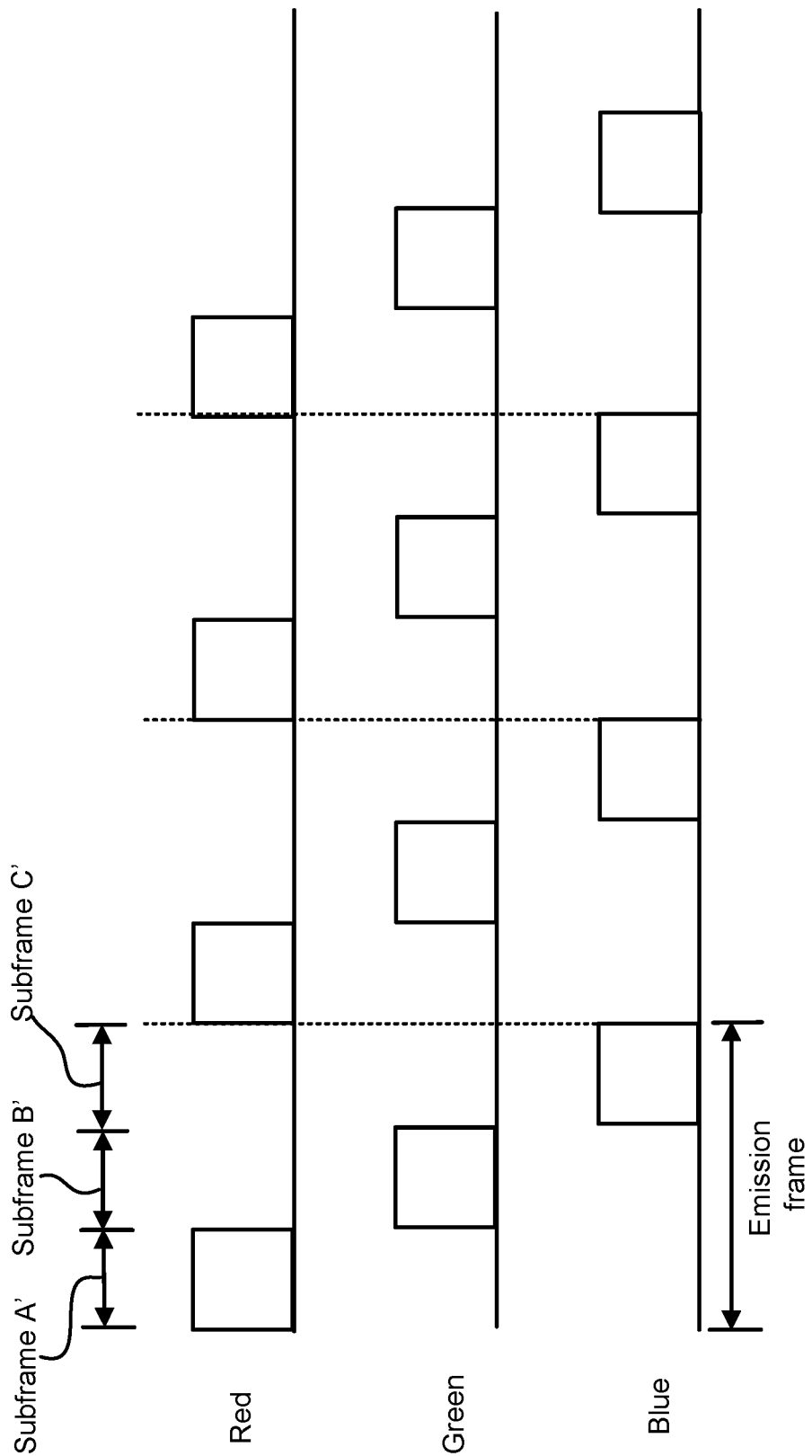
FIG. 6B is a timing diagram illustrating emission patterns of LEDs with three subframes in a single frame, in accordance with an embodiment.

FIG. 6B is a timing diagram illustrating emission patterns of LEDs where each emission frame has three subframes A', B' C', in accordance with an embodiment. During subframe A', a first subset of LEDs emits light of a first color. During subframe B', a second subset of LEDs emits light, the second subset of LEDs of a second color different from the first subset of LEDs. During the subframe C', a third subset of LEDs emits light of a third color different from the first and the second colors. In the example shown in FIG. 6B, the first subset of LEDs is red LEDs 410, the second subset of LEDs is green LEDs 420, and the third subset of LEDs is blue LEDs 430. In other examples, the subset of LEDs may have different colors from what is shown in FIG. 6B. The subframes A', B', C' may have equal time durations or have different time durations. However, the sum of the time durations for the subframes A', B', and C' must be equal to or shorter than a time duration of a frame.

During subframe A', the red LEDs 410 are turned on while the green LEDs 420 and the blue LEDs 430 are turned off. During subframe B', the green LEDs 420 are turned on while red LEDs 410 and blue LEDs 430 are turned off. During subframe C', the blue LEDs 430 are turned on while red LEDs 410 and green LEDs 420 are turned off.

When there are three subframes and each row of LEDs on the array 400 is driven to emit light during a different subframe as shown in the timing diagram of FIG. 6B, the distance D1 between the red LEDs 410 and the green LEDs 420 and the distance D2 between the green LEDs 420 and the blue LEDs 430 are the same. However, the distances D1 and D2 are greater than the distance between adjacent rows for a display device that is configured to emit light from all three rows of the array 400 at the same time during the emission frame (e.g., all three rows of the array emitting light during a first half of an emission frame).

Figure 7A:
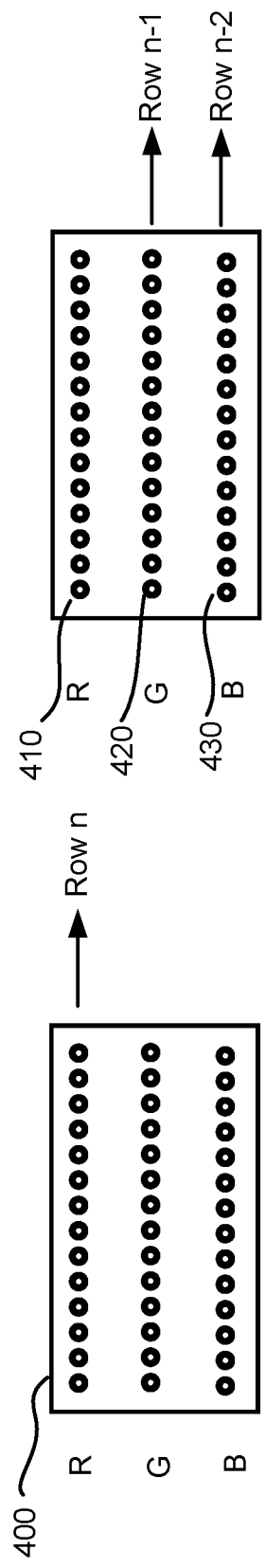
FIGS. 7A-7C are conceptual diagrams illustrating rows onto which LEDs project light for emission frames with two subframes, in accordance with an embodiment.
Figure 7B:
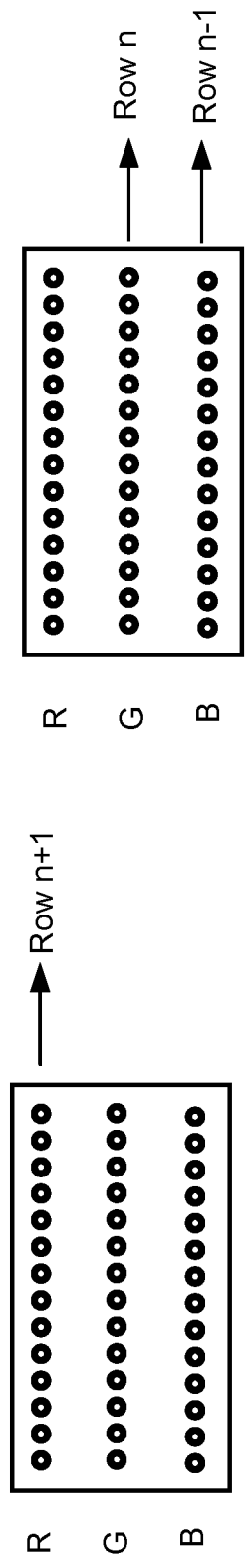
Figure 7C:
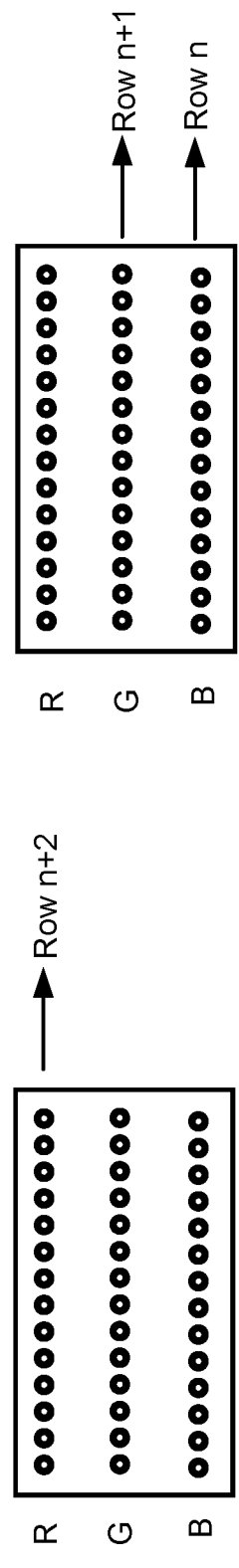

FIGS. 7A-7C are conceptual diagrams illustrating rows onto which LEDs project light for emission frames with two subframes as described above with reference to FIG. 6A, in accordance with an embodiment. During a first subframe of each emission frame, a first subset of the LEDs on the array 400 are turned on and a second subset of the LEDs on the array 400 are turned off. During a second subframe of each emission frame that follows the first subframe, the first subset of the LEDs on the array 400 are turned off and the second subset of the LEDs on the array 400 are turned on. The red LEDs 410, the green LEDs 420, and the blue LEDs 430 are operated by the controller 330 to turn on and off during the appropriate emission subframes to emit light. Light emitted from the LEDs are reflected off a surface of the mirror 520 that rotates to scan light across the image field 530.

FIG. 7A illustrates projection of light onto the image field 530 during a first emission frame. The number of LEDs in each row of the array 400 matches the number of pixel locations in a row of the image field 530. As shown in the left diagram, red LEDs 410 on the array 400 are turned on during a first subframe of a first emission frame of three consecutive emission frames. Light emitted from red LEDs 410 is projected onto Row n of the image field 530 during the first subframe. Green LEDs 420 and blue LEDs 430 are turned off during the first subframe. Light emitted from each of the red LEDs 410 illuminates a red subpixel of a pixel location on Row n of the image field 530.

As shown in the right diagram, red LEDs 410 are turned off during a second subframe of the first emission frame, and the green LEDs 420 and blue LEDs 430 are turned on. Light emitted from the green LEDs 420 is projected onto Row n−1 of the image field 530. Row n−1 is adjacent to Row n onto which the red LEDs 410 projected light during the first subframe. Light emitted from the blue LEDs 430 is projected onto Row n−2 of the image field 530.

FIG. 7B illustrates projection of light onto the image field 530 during a second emission frame after the first emission frame, according to one embodiment. The mirror 520 redirects light emitted from the array 400 such that light emitted from the red LEDs 410, green LEDs 420, and blue LEDs 430 are projected onto rows offset by one row compared to FIG. 7A. As shown in the left diagram, light from red LEDs 410 on the array 400 are projected onto Row n+1 during a first subframe of a second emission frame, where red LEDs 410 correspond to red subpixels of pixel locations on Row n+1. As shown in the right diagram, light from green LEDs 420 is projected onto Row n and light from blue LEDs 430 is projected onto Row n−1. Light emitted from the green LEDs 420 corresponds to green subpixels of pixel locations on the Row n, and light emitted from the blue LEDs 430 corresponds to blue subpixels of pixel locations on Row n−1.

FIG. 7C illustrates projection of light onto the image field 530 during a third emission frame. As shown in the left diagram, light from red LEDs 410 is projected onto Row n+2 during a first subframe of the third emission frame. During a second subframe of the third emission frame, light from green LEDs 420 is projected onto Row n+1 and light from blue LEDs 430 is projected onto Row n.

Because each emission frame lasts for a short period of time (e.g., 345 ns), when light emitted from one emission frame to the next is indistinguishable to the human eye. Over the three consecutive emission frames shown in FIGS. 7A-7C, light emitted from red LEDs 410, green LEDs 420, and blue LEDs 430 is projected onto Row n. The light emitted from red LEDs 410 during the first subframe of the first emission frame, the light emitted from green LEDs 420 during the second subframe of the second emission frame, and the light emitted from the blue LEDs 430 during the second subframe of the third emission frame appear as one row of pixels on Row n of the image field. Although light of different colors is projected at different times, each pixel appears as a single color instead of three distinct subpixels that are each presented in a different emission frame because of the blurring and spatial integration in the human eye of light.

Although not illustrated, in a fourth emission frame following the three emission frame shown in FIGS. 7A-7C, light from red LEDs 410 is projected onto Row n+3 during a first subframe, light from green LEDs 420 is projected onto Row n+2 during a second subframe, and light from blue LEDs 430 is projected onto Row n+1 during the second subframe. The light emitted from red LEDs 410 during the first subframe of the second emission frame, light emitted from green LEDs 420 during the second subframe of the third emission frame, and light emitted from blue LEDs 430 during the second subframe of the fourth emission frame appear as one row of pixels on Row n+1.

FIGS. 8A-8C are conceptual diagrams illustrating rows onto which LEDs project light in emission frames with three subframes A', B' C', in accordance with an embodiment. FIG. 8A illustrates projection of light onto the image field 530 during a first emission frame. The first emission frame is divided into three subframes A', B', C', and during each of the subframes, a different row of LEDs is turned on to emit light. As shown in the left diagram, red LEDs 410 are turned on during a first subframe of the first emission frame and projected onto Row n while the green LEDs 420 and blue LEDs 430 are turned off. As shown in the middle diagram, the green LEDs 420 are turned on during a second subframe of the first emission frame and projected onto Row n−1 while red LEDs 410 and blue LEDs 430 are turned off. As shown in the right diagram, the blue LEDs 430 are turned on during a third subframe of the emission frame and projected onto Row n−2 while red LEDs 410 and green LEDs 420 are turned off.

FIG. 8B illustrates projection of light onto the image field 530 during a second emission frame immediately after the first emission frame. The mirror 520 redirects light emitted from the array 400 such that light emitted from the red LEDs 410, green LEDs 420, and blue LEDs 430 are projected onto rows offset by one row compared to FIG. 7A. As shown in the left diagram, red LEDs 410 are turned on during a first subframe of the second emission frame and projected onto Row n+1 while the green LEDs 420 and blue LEDs 430 are turned off. As shown in the middle diagram, the green LEDs 420 are turned on during a second subframe of the second emission frame and projected onto Row n while red LEDs 410 and blue LEDs 430 are turned off. As shown in the right diagram, the blue LEDs 430 are turned on during a third subframe of the second emission frame and projected onto Row n−1 while the red LEDs 410 and green LEDs 420 are turned off.

FIG. 8C illustrates projection of light onto the image field 530 during a third emission frame immediately after the second emission frame. As shown in the left diagram, red LEDs 410 are turned on during a first subframe of the third emission frame and projected onto Row n+2 while the green LEDs 420 and blue LEDs 430 are turned off. As shown in the middle diagram, the green LEDs 420 are turned on during a second subframe of the third emission frame and projected onto Row n+1 while red LEDs 410 and blue LEDs 430 are turned off. As shown in the right diagram, the blue LEDs 430 are turned on during a third subframe of the third emission frame and projected onto Row n while the red LEDs 410 and green LEDs 420 are turned off.

Light emitted from red LEDs 410 during the first subframe of the first emission frame, light emitted from green LEDs 420 during the second subframe of the second subframe, and light emitted from blue LEDs 430 during the third subframe of the third subframe appear as one row of pixels on Row n of the image field.

Example Method of Operating Display Device

Figure 9:
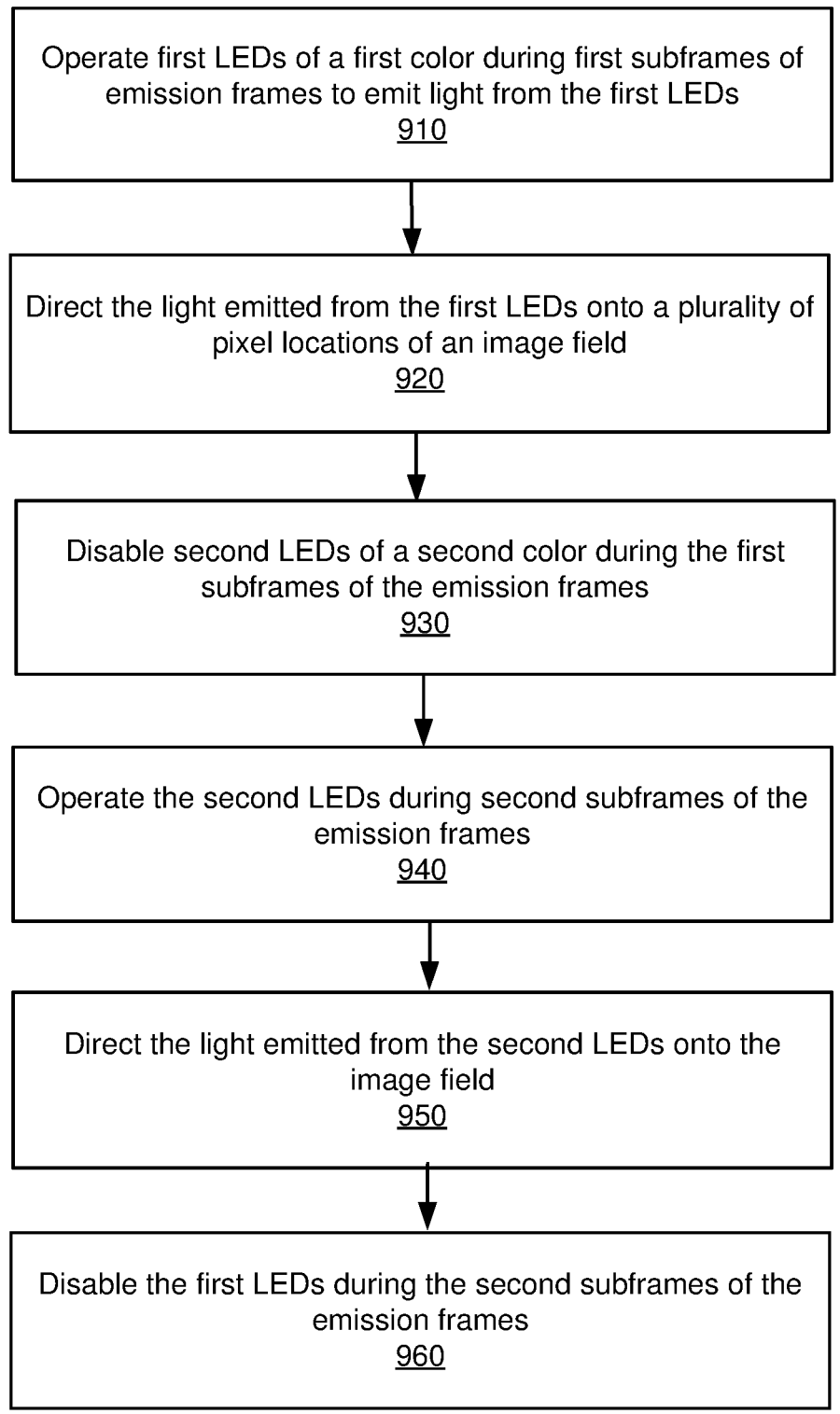
FIG. 9 is flowchart depicting a process of operating a display device, in accordance with an embodiment.

FIG. 9 is flowchart depicting a process of operating a display device, in accordance with an embodiment. The display device is configured to operate 910 the first LEDs of a first color during first subframes of emission frames to emit light from the first LEDs. The display device is configured to direct 920 the light emitted from the first LEDs onto a plurality of pixel locations of an image field. The light emitted from the first LEDs may be directed to a rotating mirror that projects the light onto the plurality of pixel locations. The plurality of pixel locations may correspond to a row of pixels on the image field. While the first LEDs emit light during the first subframes, the display device is configured to disable 930 second LEDs of a second color during the first subframes of the emission frames.

The display device is configured to operate 940 the second LEDs during second subframes of the emission frames. The display device is configured to direct 950 the light emitted from the second LEDs onto the plurality of pixel locations of the image field. While the second LEDs emit light during the second subframes, the display device is configured to disable 960 first LEDs during the second subframes of the emission frames.

In some embodiments, the display device includes third LEDs of a third color. The display device may operate the third LEDs during the second subframes of the emission such that the second LEDs and the third LEDs emit light during the second subframes.

In other embodiments, the display device may operate the third LEDs during third subframes of the emission frames. The display device may be configured to disable the first LEDs and the second LEDs during the third subframes while the third LEDs emit light.

In some embodiments, the first LEDs are arranged along a first row of an array, the second LEDs are arranged along a second row parallel to the first row at one side of the first row, and the third LEDs are arranged along a third row parallel to the first and second rows at an opposite side of the first row.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:
a plurality of first light emitting diodes (LEDs) configured to emit light of a first color onto a first row of pixel locations on an image field during a first subframe of an emission frame but not during a second subframe of the emission frame, the first subframe not overlapping with the second subframe;
a plurality of second LEDs configured to emit light of a second color onto a second row of pixel locations different from the first row on the image field during the second subframe of the emission frame but not during the first subframe of the emission frame;
a mirror configured to reflect the light emitted by the first LEDs onto the first row of pixel locations on the image field during the first subframe and reflect the light emitted by the second LEDs onto the second row of pixel locations on the image field during the second subframe; and
a controller configured to:
operate the first LEDs and disable the second LEDs during the first subframe of the emission frame, and
operate the second LEDs and disable the first LEDs during the second subframe of the emission frame.

2. The display device of claim 1, further comprising:
a plurality of third LEDs configured to emit light of a third color onto a third row of pixel locations different from the first row and the second row of pixel locations on the image field,
wherein the first LEDs are aligned along a first row on an array of LEDs, the second LEDs are aligned along a second row parallel to the first row at one side of the first row on the array of LEDs, and the third LEDs are aligned along a third row parallel to the first and second rows at an opposite side of the first row on the array of LEDs.

3. The display device of claim 2, wherein the third LEDs are operated on by the controller during the first subframe of the emission frame and disabled by the controller during the second subframe of the emission frame.

4. The display device of claim 3, wherein the first LEDs along the first row on the array of LEDs are at a first distance away from the second LEDs along the second row on the array of LEDs, and the first LEDs along the first row on the array of LEDs are at a second distance away from the third LEDs along the third row on the array of LEDs, and wherein the first distance is (n+1/2) times the second distance, where n is 0 or an integer larger than 0.

5. The display device of claim 2, wherein the third LEDs are operated by the controller during a third subframe of the emission frame and disabled during the first subframe and the second subframe of the emission frame, the third subframe not overlapping with the first subframe or the second subframe.

6. The display device of claim 5, wherein the first LEDs along the first row on the array of LEDs are at a first distance away from the second LEDs along the second row on the array of LEDs, and the first LEDs along the first row are at a second distance away from the third LEDs along the third row on the array of LEDs, and wherein the first distance is equal to the second distance.

7. A method comprising:
operating a plurality of first LEDs of a first color during a first subframe of an emission frame to emit light from the first LEDs;
directing the light emitted from the first LEDs onto a first row of pixel locations of an image field by reflecting the light emitted from the first LEDs off a mirror during the first subframe of the emission frame;
disabling a plurality of second LEDs of a second color during the first subframe of the emission frame;
operating the second LEDs during the second subframe of the emission frame to emit light from the second LEDs;
directing the light emitted from the second LEDs onto the second row of pixel locations of the image field by reflecting the light emitted from the second LEDs off the mirror during the second subframe of the emission frame; and
disabling the first LEDs during the second subframe of the emission frame, the first frame not overlapping with the second subframe.

8. The method of claim 7, further comprising:
operating a plurality of third LEDs to emit light from the third LEDs, wherein the first LEDs are aligned along a first row on an array of LEDs, the second LEDs are aligned along a second row parallel to the first row at one side of the first row on the array of LEDs, and the third LEDs are aligned along a third row parallel to the first and second rows at an opposite side of the first row on the array of LEDs.

9. The method of claim 8, wherein the third LEDs are operated during the first subframe of the emission frame and disabled during the second subframe of the emission frame by a controller.

10. The method of claim 9, wherein the first LEDs along the first row are at a first distance away from the second LEDs along the second row on the array of LEDs, and the first LEDs along the first row on the array of LEDs are at a second distance away from the third LEDs along the third row on the array of LEDs, and wherein the first distance is equal to (n+1/2) times the second distance where n is 0 or an integer larger than 0.

11. The method of claim 8, wherein the third LEDs are operated during a third subframe of the emission frame and disabled during the first subframe and the second subframe of the emission frame, the third subframe not overlapping with the first subframe or the second subframe.

12. The method of claim 11, wherein the first LEDs along the first row on the array of LEDs are at a first distance away from the second LEDs along the second row on the array of LEDs, and the first LEDs along the first row on the array of LEDs is at a second distance away from the third LEDs along the third row on the array of LEDs, and wherein the first distance is equal to the second distance.

13. An array of LEDs comprising:
a plurality of first LEDs arranged along a first row on the array of LEDs and configured to emit light of a first color onto a plurality of pixel locations on an image field;
a plurality of second LEDs arranged along a second row at one side of the first row and separated from the first row by a first distance on the array of LEDs, the second LEDs configured to emit light of a second color onto the plurality of pixel locations on the image field; and
a plurality of third LEDs arranged along a third row at another side of the first row and separated from the first row by a second distance on the array of LEDs, the third LEDs configured to emit light of a third color onto the plurality of pixel locations on the image field, the first distance corresponding to (n+1/2) times the second distance where n is 0 or an integer larger than 0.

14. The array of LEDs of claim 13, wherein the second and third LEDs are configured to be operated at times when the first LEDs are disabled during first subframes of emission frames.

15. The array of LEDs of claim 14, wherein the first LEDs are configured to be operated at times when the second and third LEDs are disabled during second subframes of emission frames.

16. The array of LEDs of claim 13, wherein light emitted from the first, second, and third LEDs is reflected from a mirror onto the plurality of pixel locations.

\* \* \* \* \*